US009229603B2

(12) United States Patent
Deimbacher et al.

(10) Patent No.: US 9,229,603 B2
(45) Date of Patent: Jan. 5, 2016

(54) METHODS, SYSTEMS, APPARATUSES, AND COMPUTER-READABLE MEDIUMS FOR PROVISIONING PETROTECHNICAL WORKFLOWS IN A CLOUD COMPUTING ENVIRONMENT

(75) Inventors: Franz X. Deimbacher, Houston, TX (US); Walter H. Goggan, The Woodlands, TX (US); Joseph Culley, Pearland, TX (US); Slavomir Pastor, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 371 days.

(21) Appl. No.: 12/979,794

(22) Filed: Dec. 28, 2010

(65) Prior Publication Data

US 2012/0166967 A1    Jun. 28, 2012

(51) Int. Cl.
| | |
|---|---|
| *G06Q 10/00* | (2012.01) |
| *G06F 3/048* | (2013.01) |
| *G06F 9/455* | (2006.01) |
| *G06Q 10/10* | (2012.01) |
| *G06F 9/44* | (2006.01) |
| *G06Q 10/06* | (2012.01) |
| *G06F 9/50* | (2006.01) |

(52) U.S. Cl.
CPC ........ *G06F 3/048* (2013.01); *G06F 8/30* (2013.01); *G06F 9/45533* (2013.01); *G06F 9/5072* (2013.01); *G06Q 10/06* (2013.01); *G06Q 10/0633* (2013.01); *G06Q 10/10* (2013.01)

(58) Field of Classification Search
CPC ....... G06Q 40/00; G06Q 10/00; G06Q 30/00; G06Q 50/00; G06Q 10/0633; G06Q 10/10; G06F 9/50; G06F 8/30
See application file for complete search history.

(56) References Cited

U.S. PATENT DOCUMENTS

| | | | | |
|---|---|---|---|---|
| 6,792,431 | B2* | 9/2004 | Tamboli et al. | 1/1 |
| 7,389,321 | B2* | 6/2008 | Estrada et al. | 709/205 |
| 7,502,771 | B2* | 3/2009 | Bouzas | G06F 8/10 700/30 |
| 7,734,682 | B2* | 6/2010 | Aubry et al. | 709/203 |
| 7,778,859 | B2* | 8/2010 | Bouzas et al. | 705/7.11 |
| 7,793,297 | B2* | 9/2010 | Aggarwal et al. | 718/104 |
| 7,818,372 | B1* | 10/2010 | Cutrell et al. | 709/204 |
| 7,996,204 | B2* | 8/2011 | Oslake et al. | 703/22 |
| 8,180,658 | B2* | 5/2012 | Hamadi et al. | 705/7.11 |
| 8,190,458 | B2* | 5/2012 | Back et al. | 705/7.31 |
| 8,244,874 | B1* | 8/2012 | Thireault | 709/226 |

(Continued)

OTHER PUBLICATIONS

Service company geomechanics group: Knowledge integration is our objective. Drilling Contractor. Sep./Oct. 2008.*

(Continued)

*Primary Examiner* — Jamie Swartz
(74) *Attorney, Agent, or Firm* — Alec J. McGinn

(57) ABSTRACT

A method, system, and computer readable storage medium according to an exemplary embodiment of the present disclosure, may provide a cloud computing environment (CCE) that includes a plurality of resources, and receives, at the CCE, a request from a user for performing a petrotechnical workflow. The user may be remotely located with respect to the CCE. Furthermore, embodiments of the present disclosure may provision one or more of the plurality of resources for performing the petrotechnical workflow; perform the petrotechnical workflow using the one or more provisioned resources; and associate a cost with usage of the one or more provisioned resources for performing the petrotechnical workflow.

22 Claims, 11 Drawing Sheets

(56) References Cited

U.S. PATENT DOCUMENTS

| | | | | |
|---|---|---|---|---|
| 2002/0120741 | A1* | 8/2002 | Webb et al. | 709/225 |
| 2004/0054717 | A1* | 3/2004 | Aubry et al. | 709/203 |
| 2005/0149307 | A1* | 7/2005 | Gurpinar et al. | 703/10 |
| 2005/0160429 | A1* | 7/2005 | Hameleers et al. | 718/105 |
| 2007/0124186 | A1* | 5/2007 | Virine | 705/8 |
| 2007/0179742 | A1* | 8/2007 | Tabanou et al. | 702/181 |
| 2008/0052097 | A1* | 2/2008 | Bouzas et al. | 705/1 |
| 2008/0126168 | A1* | 5/2008 | Carney et al. | 705/8 |
| 2008/0172272 | A1* | 7/2008 | Back | G06Q 10/06 705/7.36 |
| 2008/0235598 | A1* | 9/2008 | Estrada et al. | 715/744 |
| 2008/0262822 | A1* | 10/2008 | Hardwick et al. | 703/21 |
| 2008/0271039 | A1* | 10/2008 | Rolia et al. | 718/105 |
| 2009/0049177 | A1* | 2/2009 | Iszlai | G06Q 10/06375 709/226 |
| 2009/0125362 | A1* | 5/2009 | Reid et al. | 705/8 |
| 2009/0240911 | A1* | 9/2009 | Yamada et al. | 711/171 |
| 2009/0254572 | A1* | 10/2009 | Redlich et al. | 707/10 |
| 2010/0257004 | A1* | 10/2010 | Perlmutter et al. | 705/7 |
| 2011/0022435 | A1* | 1/2011 | Reid et al. | 705/7 |
| 2011/0276977 | A1* | 11/2011 | van Velzen | G06F 9/5038 718/104 |
| 2012/0137002 | A1* | 5/2012 | Ferris et al. | 709/226 |

OTHER PUBLICATIONS

Production Data Management Dramatically Increases Performance. Schlumberger. 1-2. 2007. secured doc; see: http://www.slb.com/~/media/Files/production/case_studies/pdms_middleeast_ogdcl.ashx.*

Schlumberger IPM Bolsters Project Management with Enterprise Solution. 1-6. 2010.*

Lin D and Ledoux T (2007). Optimizing Data Storage and Management for Petrel Seismic Interpretation and Reservoir Modeling. 1-8.*

Bengio M (2010). Innovation for the Long Run. 1-7.*

Yu, Jia, and Rajkumar Buyya. "A taxonomy of workflow management systems for grid computing." Journal of Grid Computing 3.3-4 (2005): 171-200.*

Yu, Jia. "QoS-based Scheduling of Workflows on Global Grids." (2007).*

Schlumberger, "Petrel E&P. Software Platform" (2012), available at www.slb.com/services/software/geo/petrel.aspx.

Schlumberger, "Petrel 2012 Reservoir Engineering; Shared earth—critical insight" (2012).

Schlumberger, "Eclipse 2012 Reservoir Engineering Software " (2012), available at www.slb.com/services/software/reseng/eclipse.aspx.

Schlumberger, "Avocet Production Operations Software Platform" (2012), available at www.slb.com/services/software/production_software/intprodsurv/avocet.aspx.

Schlumberger, "Avocet Production Operations Software; Hit your production targets consistently" (2012).

Schlumberger, "Eclipse 2011; Industry-reference reservoir simulator" (2011).

Schlumberger, "Data Analysis" (2012), available at www.slb.com/services/software/geo/petrel/geomodeling/data_analysis.aspx.

* cited by examiner

FIG. 7

METHODS, SYSTEMS, APPARATUSES, AND COMPUTER-READABLE MEDIUMS FOR PROVISIONING PETROTECHNICAL WORKFLOWS IN A CLOUD COMPUTING ENVIRONMENT

BACKGROUND

Petrotechnical software may offer workflow functionality that spans one or more domains, including, without limitation, seismic, simulation, and economics. Examples of such software may include one or more of the following:

- Integrated Asset Modeler software (IAM) (e.g., as may be provided by SCHLUMBERGER AVOCET IAM software);
- Software that provides automated history-matching and uncertainty workflows (e.g., as may be provided by SCHLUMBERER PETREL software or SCHLUMBERER ECLIPSE software); and
- Software that provides seismic processing on backend computing servers with quality control and interpretation on frontend 3D graphics packages.

The foregoing are just a few examples of petrotechnical software. In some conventional deployments, usage of petrotechnical software may include a single application executed on a single computer. However, some petrotechnical software and workflows may require integration between two or more pieces of petrotechnical software. Such integration may require increased computing power.

In addition, some petrotechnical software may include advanced tools for automating workflows (e.g., similar to macro-recording and re-playing). In some instances, efficient workflows execution of certain workflows may require an optimized, robust, and powerful information technology (IT) infrastructure. Because of the expenses related to building and maintaining IT infrastructure necessary for executing certain petrotechnical software, it may not be possible for an organization to deploy such petrotechnical software in timely and/or cost-effective manner. As a result, IT infrastructure requirements may make it difficult to sell such petrotechnical software. Furthermore, because of the complexity of such petrotechnical software, and the complexity of the required IT infrastructure, some organizations may have to deal with issues related to integrating such petrotechnical software and IT requirements in a way that is compatible with existing IT infrastructure.

Certain other constraints may inhibit the provisioning of an optimized petrotechnical environment. Some examples include (a) network and operating system (OS) standards that are not compatible with certain petrotechnical software requirements, (b) corporate images that cannot be modified, (c) out-dated and/or and non-performing hardware, and (d) incompatible security policies.

As described above, conventional methods of provisioning a petrotechnical software environment may not be ideal in all respects. Accordingly, a Cloud Computing Environment (CCE) according to embodiments of the present disclosure may offer advantages over conventional methods.

SUMMARY

An exemplary embodiment of the present disclosure may include a method that may include providing a cloud computing environment (CCE) comprising a plurality of resources, and receiving, at the CCE, a request from a user for performing a petrotechnical workflow, wherein the user is remotely located with respect to the CCE. Further, the method may include provisioning one or more of the plurality of resources for performing the petrotechnical workflow, performing the petrotechnical workflow using the one or more provisioned resources. In addition, the method may include associating a cost with usage of the one or more provisioned resources for performing the petrotechnical workflow.

Another exemplary embodiment of the present disclosure may include a system that includes a memory, and a processor operatively connected to the memory and having functionality to execute instructions to perform the foregoing method.

Yet another exemplary embodiment of the present disclosure may include a computer readable storage medium storing instructions, the instructions when executed causing a processor to perform the foregoing method.

BRIEF DESCRIPTION OF THE DRAWINGS

The detailed description is described with reference to the accompanying figures. The same numbers are used throughout the drawings to reference like features and components.

FIG. 7 is a schematic illustration of a user interface according to an embodiment of the present disclosure.

DETAILED DESCRIPTION

Figure 1:
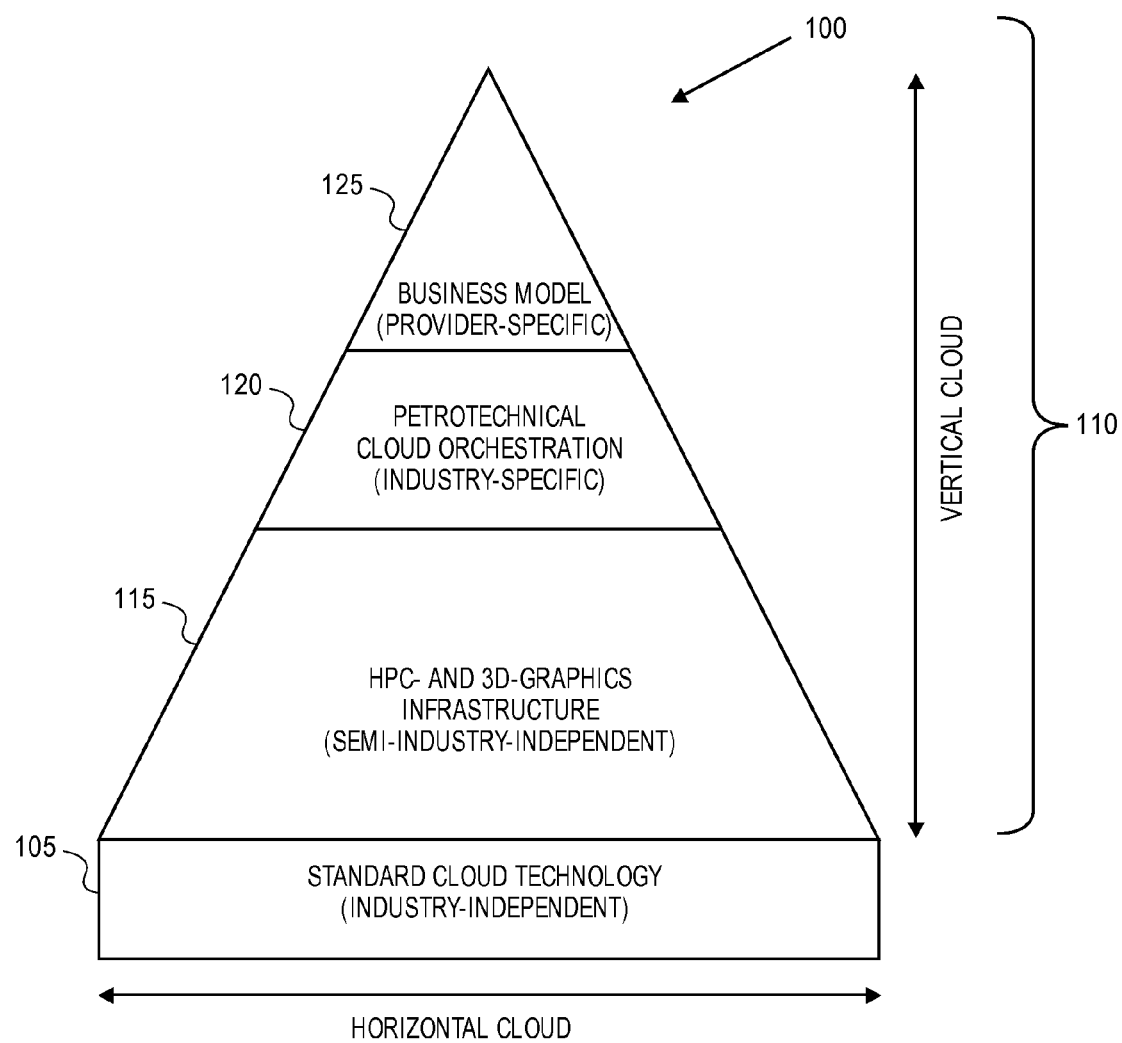
FIG. 1 is a schematic illustration of a CCE model according to an embodiment of the present disclosure.

FIG. 1 illustrates an exemplary embodiment of a Cloud Computing Environment (CCE) that includes a combination of technologies brought together in various exemplary embodiments. In an embodiment, a CCE may be adapted to provide petrotechnical workflows to a remotely located user.

A CCE may provide a framework for dynamic provisioning of computing infrastructure and licensed petrotechnical software. As described herein, embodiments of a CCE may include one or more of a method, a computer-readable medium, an apparatus, and a system.

Automation and self-servicing functionality may also be provided by an exemplary embodiment of a CCE. For example, an exemplary embodiment of a CCE may provide automatic provisioning of a workflow-optimized IT infrastructure and petrotechnical software at reduced costs. Furthermore, a CCE may offer on-demand "elasticity" of hardware and/or software resources (i.e. the illusion of unlimited hardware and/or software resources). The foregoing aspects of a CCE may be coupled with a business model. For example, a consumption-based (e.g., "as-a-service") business model may be provided by a CCE to deliver petrotechnical software and workflows in a cost-effective manner.

An exemplary horizontal cloud 105 is shown in FIG. 1. Horizontal clouds may be industry-independent (i.e., applicable to multiple industries), and may include virtualization technologies. A benefit of cloud computing may include potential reduction of Total Cost of Ownership (TCO) for hardware and software resources.

The term "vertical cloud" may be used to describe industry-specific cloud computing solutions that are optimized to meet hardware and software requirements of a particular industry. In addition to TCO reduction, an aspect of a vertical cloud, may include the ability to provision complex computing environments to enable remote execution of various workflows.

There may be one or more differences between a vertical cloud and a horizontal cloud. For example, a vertical cloud may provision licensed software on one or more interconnected computers to offer an industry-specific workflow, and thereby may solve certain industry-specific problems. On the other hand, a horizontal cloud may merely provide a generic virtual instance (e.g. a simple virtual instance on a computing core), and a user may need to find a way to make use of this generic instance by installing and configuring any type of software. Accordingly, a horizontal cloud might not support complex connected instances due to the limited computing resources that may be associated with virtual instances.

Furthermore, a vertical cloud may need high-performance computing hardware to execute certain industry-specific workflows. In such cases, physical machines may be used to provide computing power for a vertical cloud. A horizontal cloud, on the other hand, may be optimized for energy-efficient and relatively cheap hosting of applications that are relatively less computation-intensive. In such cases, one or more virtual machines may be used to provide a user with computing power for a horizontal cloud.

In addition, a vertical cloud may provide functionality related to 3D remote visualization hardware and software. 3D remote visualization may require relatively powerful computing resources that might only be provided by physical machines. Virtual machines, on the other hand, might not be able to provide the computing resources needed for 3D remote visualization. As a result, certain horizontal clouds that solely provide access to virtual machines may be limited to providing 2D remote desktop visualization.

An embodiment of a CCE may include one or more aspects of a horizontal cloud and a vertical cloud. Traditionally, horizontal cloud and vertical cloud technologies operated separately, at least because making such technologies work together and provisioning these technologies in an automated fashion posed one or more challenges. However, embodiments of a CCE can overcome one or more of these challenges. As a result, in addition to providing TCO reduction, a CCE may increase the productivity of a user (or portions of a company) by orders of magnitude.

With a vertical cloud, hardware provisioning "elasticity" may be achieved by combining a consumption-based business model and a partnership with a hardware vendor which provides hardware-as-a-service. In an embodiment, a vertical cloud may support an "as-a-service" business model. In such a business model, usage charges may be based upon resource usage, and the user might not be charged if there is no usage. An exemplary incentive scheme may provide incentives, such as monetary credits, to users of a CCE that meet predetermined criteria (e.g., to encourage usage and reward frequent users). This may enable a tiered discount pricing structure. On the other hand, with respect to a solution that is based solely on a horizontal cloud, a horizontal cloud provider may need to invest money upfront to purchase or lease hardware. Accordingly, a horizontal cloud provider may be responsible for fixed costs related to purchased or leased hardware, and may need to rely on high utilization by users to recoup these upfront investments.

An embodiment of a CCE may include one or more of the following cloud computing principles: sharing resources, automation, and self-servicing. Furthermore, in an embodiment, a CCE may include one or more of the following technologies:

High-performance computing infrastructure (e.g. in an embodiment, this may provide seismic processing, reservoir simulation, and other petrotechnical data and applications);

High-performance graphics servers with remote 3D visualization capability (e.g., in an embodiment, this may be optimized for petrotechnical data and applications);

Virtualized computing machines (i.e., as opposed to physical computing machines);

Storage solutions (e.g., in an embodiment, storage solutions may be optimized for petrotechnical data and applications that are capable of secure multi-tenancy hosting of data);

Advanced logon authentication tools and/or as security software (e.g., in an embodiment, this may be adapted to isolate users or companies from each other while operating in a shared environment, and may be adapted for both physical and virtual computing machines);

Data Loss Prevention (DLP) (e.g., in an embodiment, this may include tools that label files and classify which actions are allowed to be performed with a particular file, such as read, write, transfer off a cloud, etc.);

Automatic provisioning of hardware resources (e.g., in an embodiment, this may be done via a web browser type interface);

Automatic provisioning of software (e.g., in an embodiment, this may be done individually or in combination with petrotechnical workflows via a web browser type interface);

Automatic license generation, provisioning, and tracking;

Real-time tracking of resource usage (e.g., in an embodiment, real-time tracking may provide budgeting and invoicing functionality);

Advanced multi-user and multi-site collaboration technologies;

A secure connectivity center linking together a public and private cloud; and

One or more business models (e.g., in an embodiment, this may provide "resource elasticity" and flexible resource usage "as a service").

Various aspects of the foregoing are described in more detail below. Furthermore, the foregoing is merely exemplary, and it should be understood that other technology and concepts related to cloud computing may also be present in an embodiment of a CCE.

Various components of a CCE are schematically illustrated in FIG. 1. An entity that provides one or more aspects of a CCE may be referred to herein as a "cloud provider." In an embodiment, a CCE may include a horizontal cloud 105. A horizontal cloud may include one or more cloud technologies, including, without limitation, virtualization, load balancing, and security. Furthermore, a horizontal cloud may include a business model. As an example, a business model may include pricing based on utilization.

A CCE may also include a vertical cloud 110. In an embodiment, a vertical cloud may include a graphics infrastructure component 115. A graphics infrastructure component may include high-performance computing (HPC) and/or 3D graphics infrastructure. This may include hardware and middleware that is adapted to execute industry-specific workflows, including, for example, petrotechnical workflows. Depending on the flexibility of a software stack, a graphics infrastructure may be shared among one or more industries (i.e., other vertical clouds).

In addition, a vertical cloud may include a petrotechnical cloud orchestration component 120. According to an embodiment, a petrotechnical cloud orchestration component may be specifically adapted for an industry, and may be linked to a specific software provider and its business model, and/or may be optimized with respect to a particular set of software.

Furthermore, a petrotechnical cloud orchestration component may provide a user interface that enables access to various aspects of a CCE. A user interface may include a web-based graphical user interface, and may provide access to underlying functionality in a relatively user-friendly manner.

A vertical cloud may also include a business model component 125. In an embodiment, a business model component may be integrated with a specific cloud provider, the business models of a cloud provider, and/or business systems used by a cloud provider.

According to an embodiment, a CCE may include a multi-level management component (not shown). Each level may include different access rights and functionality. For example, a multi-level management component may manage one or more users' access to one or more pools of shared hardware and/or software resources. For example, a CCE administrator may be granted the highest level privileges, which may enable management and access of all CCE resources. In contrast, a CCE administrator that is granted only lower level privileges may only manage and access a subset of CCE resources.

A CCE administrator may provide entire companies or individual company users with access to a CCE. In an embodiment, access to a CCE may be granted to companies and users based on an agreement between a company and a cloud provider that outlines desired resources. For example, access may be granted interactively upon registration, provision of billing details, and receipt of payment. This may include online registration, upfront payment involving credit cards, and other payment mechanisms. For example, online payment mechanisms, such as PAYPAL, may be used to implement this functionality. In other embodiments, two or more parties may negotiate a paper-based agreement that sets a forth CCE's terms of use.

If a company is provided access to a CCE (i.e., a cloud administrator has granted access to the company), the administration and provisioning of resources to company users may be performed by a company administrator. In an embodiment, this may be done using interactive web-based tools. A company administrator may be responsible for checking the eligibility of company users, and may control company users' access to CCE resources by defining one or more levels of access privileges. CCE resources may be allocated to company users with respect to a pool of resources that may be set aside for such company. Alternatively, in another embodiment, a single company and its users may allocate all of the resources offered by a CCE.

A predetermined budget may be agreed between a CCE provider and a company. When a company's users access one or more resources of a CCE, incurred costs may be subtracted from the budget. The remaining budget may be calculated and displayed to users at various intervals via a user interface. In an embodiment, budget information may be provided at a various levels of granularity. For example, budget information may be based on different types of users or groups.

According to an embodiment, a notification may be sent to a company administrator or user when the remaining budget for a user, a group, or the company is less than a predetermined threshold. A notification may be in the form of an email, a text message, a phone call, or any other form of communication known in the art.

A company user may be able to use one or more resources that have been allocated to him/her. In an embodiment, these resources may include a pool of physical computing machines with certain characteristics, a maximum amount of storage (e.g., with respect to a total amount of storage allocated for the company), or a maximum number of cores on a computing cluster. In an embodiment, a CCE may automatically determine a load status of one or more physical computing machine resources, and assign users to a least-used resource.

The resource provisioning system may also do one or more of the following: boot a physical computing machine into a required operating system; connect it to a network and/or domain, attached storage and remote 3D graphics servers (if desired); and connect to a license server with a usage tracking mechanism (e.g., pay-per-use). One or more of the foregoing actions may be initiated by a company user by providing one or more mouse clicks via a web-based GUI.

Certain petrotechnical applications may require dedicated computing resources. Accordingly, it may be desirable to maximize the performance of these resources. In order to boost performance, certain petrotechnical applications may be able to run in parallel mode (e.g., mpi-based or multi-threaded), thereby taking advantage of multiple processing cores in a server.

Parallelism may be built into an application in a manner such that a user does not need to explicitly request this functionality (i.e., it may be invoked only when certain parts of the software are used). This may result in problems related to the management of multiple users on a particular server. One reason may be that a single user may consume all hardware resources for hours or days, thereby resulting in bad or complete loss of performance for other users using the same server. Conventional technical solutions may not adequately address this issue, at least because technical resources may be limited. However, a CCE orchestration engine (e.g., as may be provided by petrotechnical cloud orchestration component 120) may be adapted to enforce rules that employ certain resource provisioning technologies, and integrate enforcement of these rules with a business model (e.g., as may be provided by business model component 125).

A resource provisioning system, such as may be provided by petrotechnical cloud orchestration component 120, may be able to identify certain hardware resources based on templates that describe the hardware characteristics. A selected resource, when idle or under-utilized, may then boot into a particular operating system, and connect to a storage, network, and/or license server.

Figure 2:
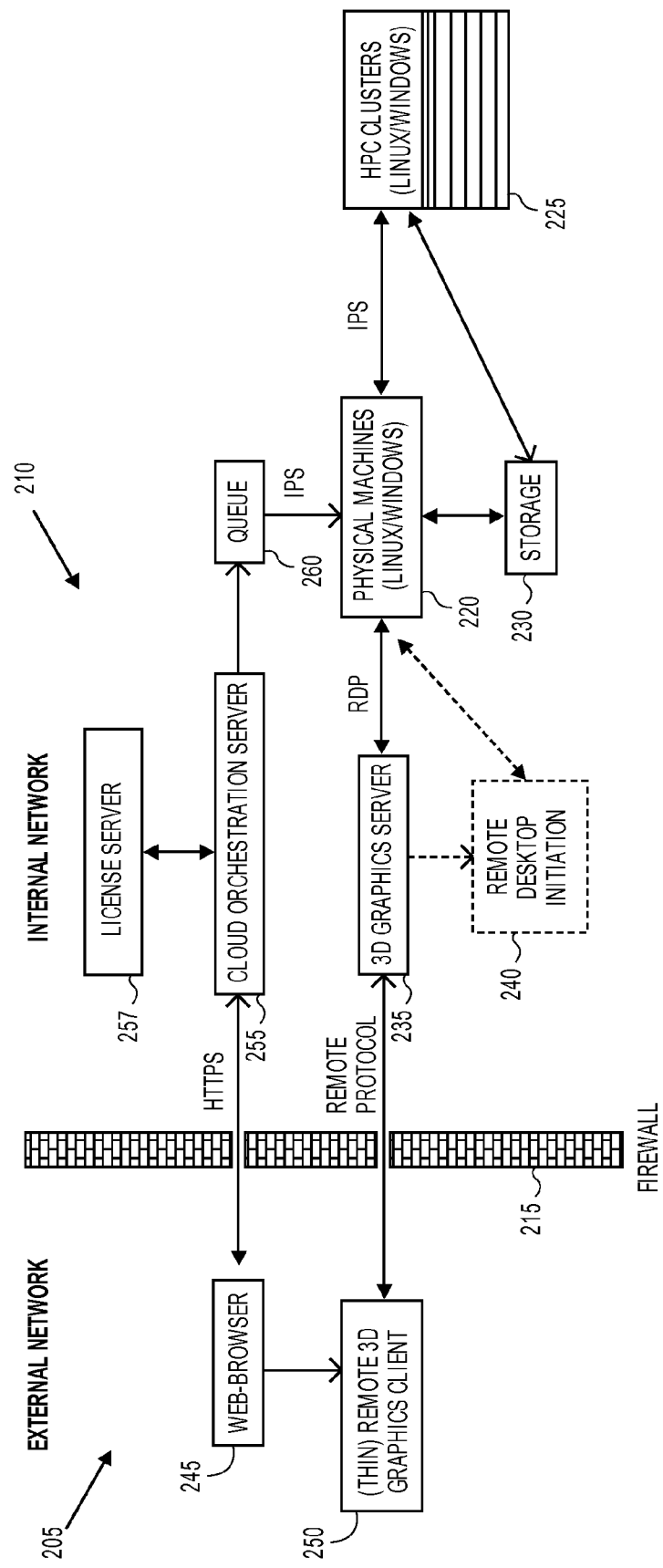
FIG. 2, a schematic illustration of a provisioning system according to an embodiment of the present disclosure.

Referring now to FIG. 2, a schematic illustration of a provisioning system 200 is shown. A petrotechnical cloud orchestration module 120 of a CCE, may include one more aspects of the provisioning system 200. In an embodiment of the provisioning system, there is an external network 205 and an internal network 210 separated by a firewall 215. A pool of computing resources may provide one or more petrotechnical software applications. In an embodiment, the pool of computing resources may include one or more physical machines 220 operating on LINUX, WINDOWS, or other operating systems. The pool of computing resources may be communicably coupled to one or more HPC clusters 225 operating on LINUX, WINDOWS, or other operating systems. The physical machines 220 and the HPC clusters 225 may be adapted to enable resource provisioning. In addition, the physical machines 220 and the HPC clusters 225 may be communicably coupled to a common storage 230. In another embodiment, the physical machines 220 and HPC clusters 225 may be communicably coupled to separate storage resources. The physical machines 220 may also be communicably coupled to one or more remote 3D graphics servers 235.

There are several ways to access the physical machines 220. In an embodiment, the physical machines 220 may be communicably coupled to a remote desktop initiation module 240 within the firewall 215. Alternatively, a user may access the physical machines 220 via a web-browser 245 that is communicably coupled to a remote 3D graphics client 250. In an embodiment, the web-browser 245 may be located outside of the firewall 215. The 3D graphics client 250 may in turn be communicably coupled to the remote 3D graphics server 235. In addition, the web-browser 245 may be communicably coupled to a cloud orchestration server 255. The cloud orchestration server 255 may in turn be communicably coupled to (a) a license server 257, and (b) a queue module 260 that is communicably coupled to the physical machines 220.

As shown by the arrows connecting the various elements of the provisioning system 200, these elements may communicate via one or more protocols (e.g., http, remote protocols, iip, bsub, rdp, etc.). In an embodiment, Infrastructure Provisioning Software (IPS) may be used to enable communication between various elements. The protocols shown in FIG. 2 are merely representative, and it should be understood that other protocols may be used.

A Secure Connectivity Center (SCC), which is not shown, may be provided for use with a CCE. A SCC may include a managed extranet firewall, and may provide a demilitarized zone (DMZ) between a company's private cloud and a public cloud. Traffic across the managed firewall may be monitored and controlled. If an SCC is implemented, communication into a private cloud may need certain special and/or explicit permissions. In an embodiment, no traffic into a private cloud is allowed. An SCC may be necessary for certain control systems (remote well control, well site video/camera control) or real-time data feeds that need to access an intranet.

A CCE may support one or more use cases. In an exemplary use case, a goal may include automatic deployment of petrotechnical IT environments coupled with business models and automated business systems. As an example, a use case may support one or more of the following:

- simplified provisioning (e.g., single mouse click provisioning) of a petrotechnical workflow for brute-force optimization, and elasticity of computing resources (e.g., via automated load balancing);
- flexible, realtime calculation of infrastructure and software costs; and
- one or more links to clouds that hosts productivity tools (e.g., MICROSOFT OFFICE software).

Figure 3:
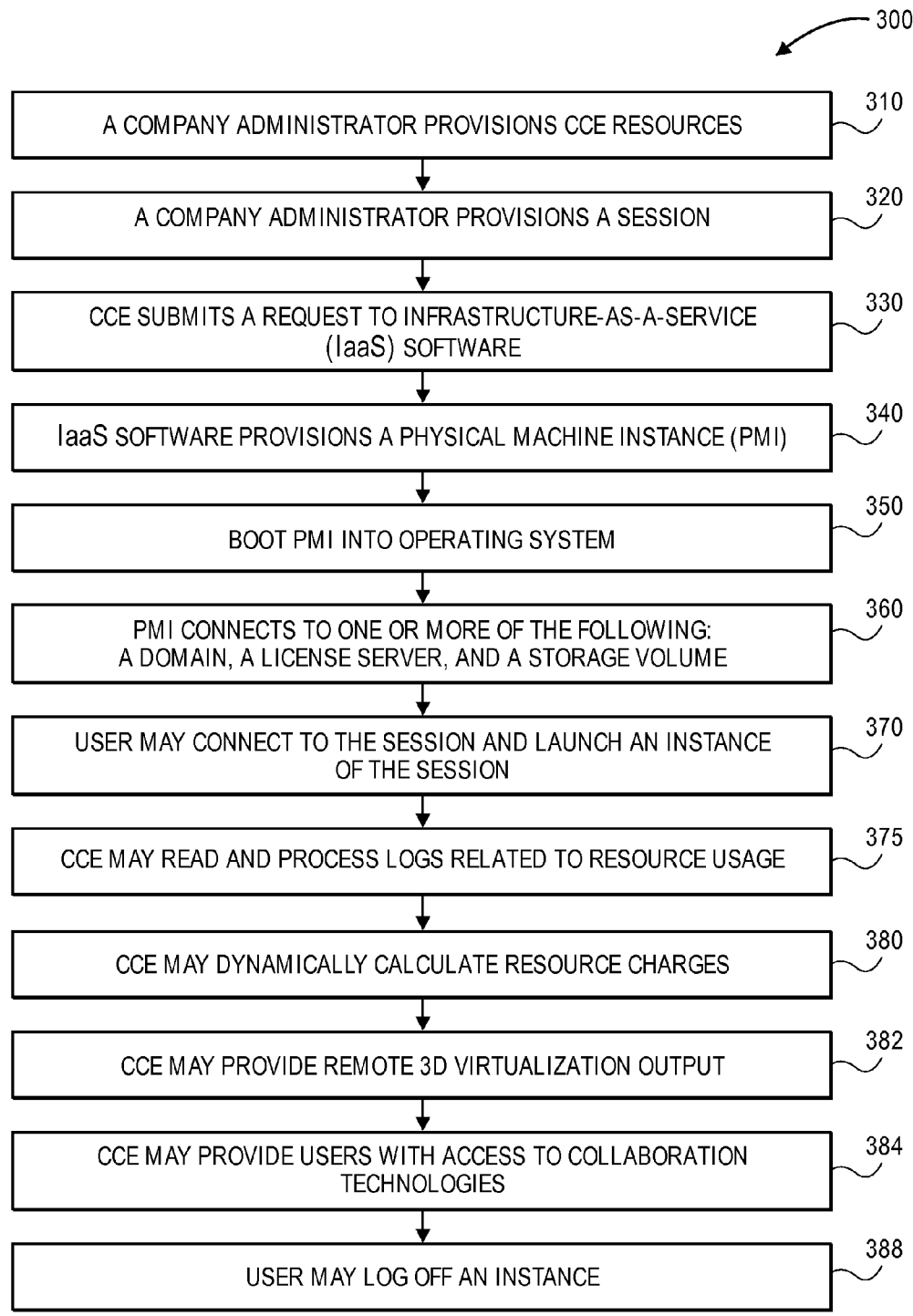
FIG. 3 is a flowchart that illustrates an exemplary method according to an embodiment of the present disclosure.

FIG. 3 is a flowchart that illustrates an exemplary method 300 that may be supported by a CCE with respect to an exemplary use case. In an exemplary use case, a user may want to execute a workflow related to well spacing optimization. The user may be registered with a CCE and may be a member of an existing valid company account.

Method 300 will be described herein with respect to execution of a well spacing optimization workflow. However, it should be understood that other applications and workflows may be supported by various aspects of method 300.

Figure 4:
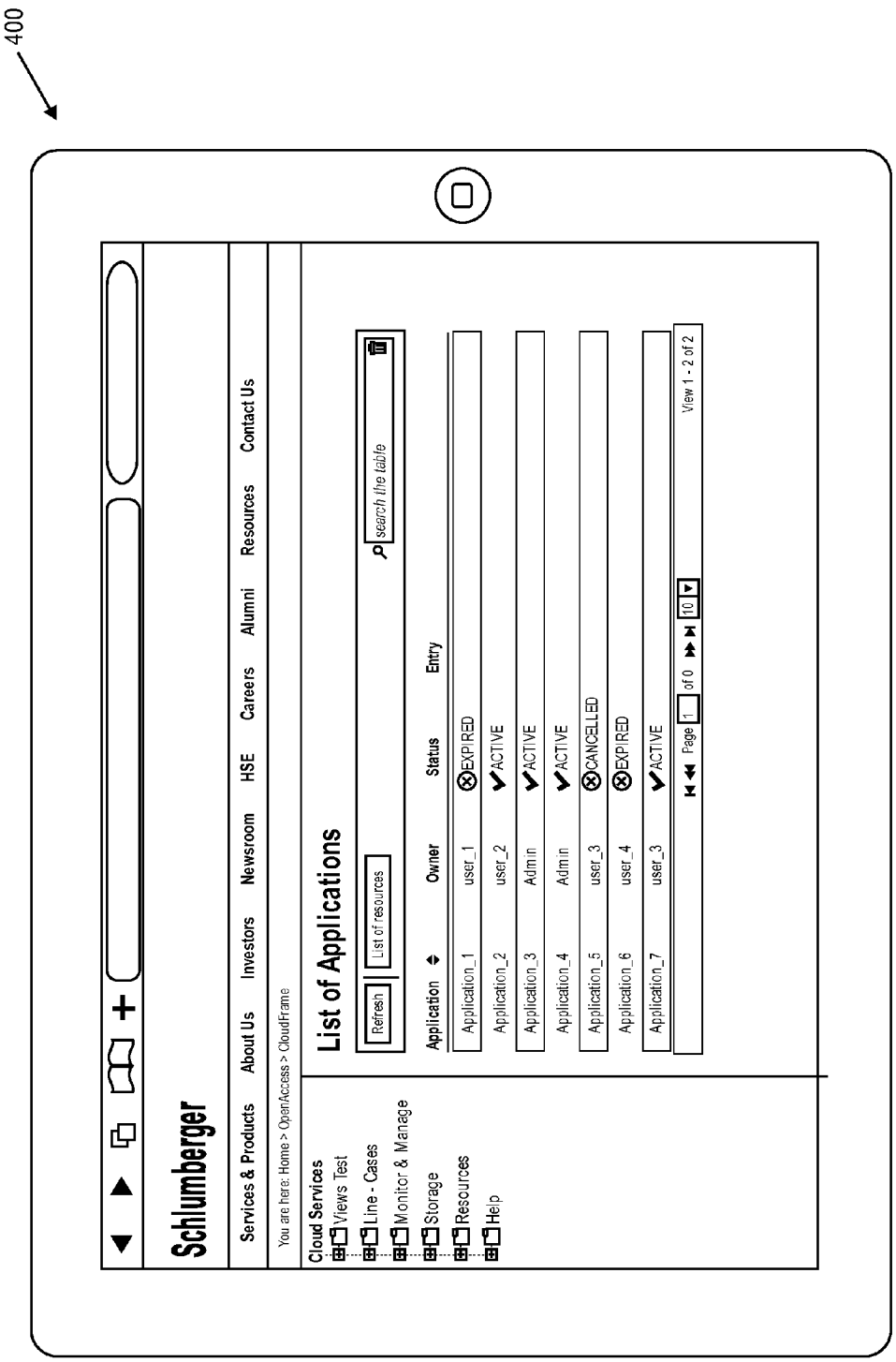
FIG. 4 is a schematic illustration of a computing device according to an embodiment of the present disclosure.

Referring briefly to FIG. 4, a schematic illustration of a computing device 400 is shown. The computing device may access a web-based user interface 410 that may be provided by a CCE. The user interface may display a list of applications or workflows that may be provisioned by a cloud administrator. In an embodiment, the computing device includes a tablet form factor, such as the APPLE IPAD. In other embodiments, the computing device may be any computing device known in the art, including, without limitation, desktops, laptops, smart phones, etc.

Referring back to FIG. 3, method 300 may include provisioning of resources by a company administrator, as shown at block 310. At this block 310, a company administrator may allocate one or more hardware resources by selecting a template. A template may be provided by a CCE to define requirements related to one or more workflows or applications.

A template may define one or more specifications and/or usage types of a physical machine. For example, the template may define a certain level of hardware resource requirements (e.g., low, medium, high). Furthermore, a template may define a Physical Machine Instance (PMI—as opposed to a virtual machine) usage type. In an embodiment, the PMI usage type may include "shared," which may indicate that a PMI may be shared with other users of the same company.

When defining a template, a company administrator may also define hardware resources available for a user on a cluster (e.g., via queue parameters such as minimum and/or maximum number of computer cores and job priority with regards to other users). The process of defining hardware resources may also include defining an amount of storage. In addition, a company administrator may define additional productivity tools related to engineering work (e.g., MICROSOFT OFFICE and MICROSOFT PROJECT), and may also define a maximum budget to be allocated for a workflow.

Figure 5:
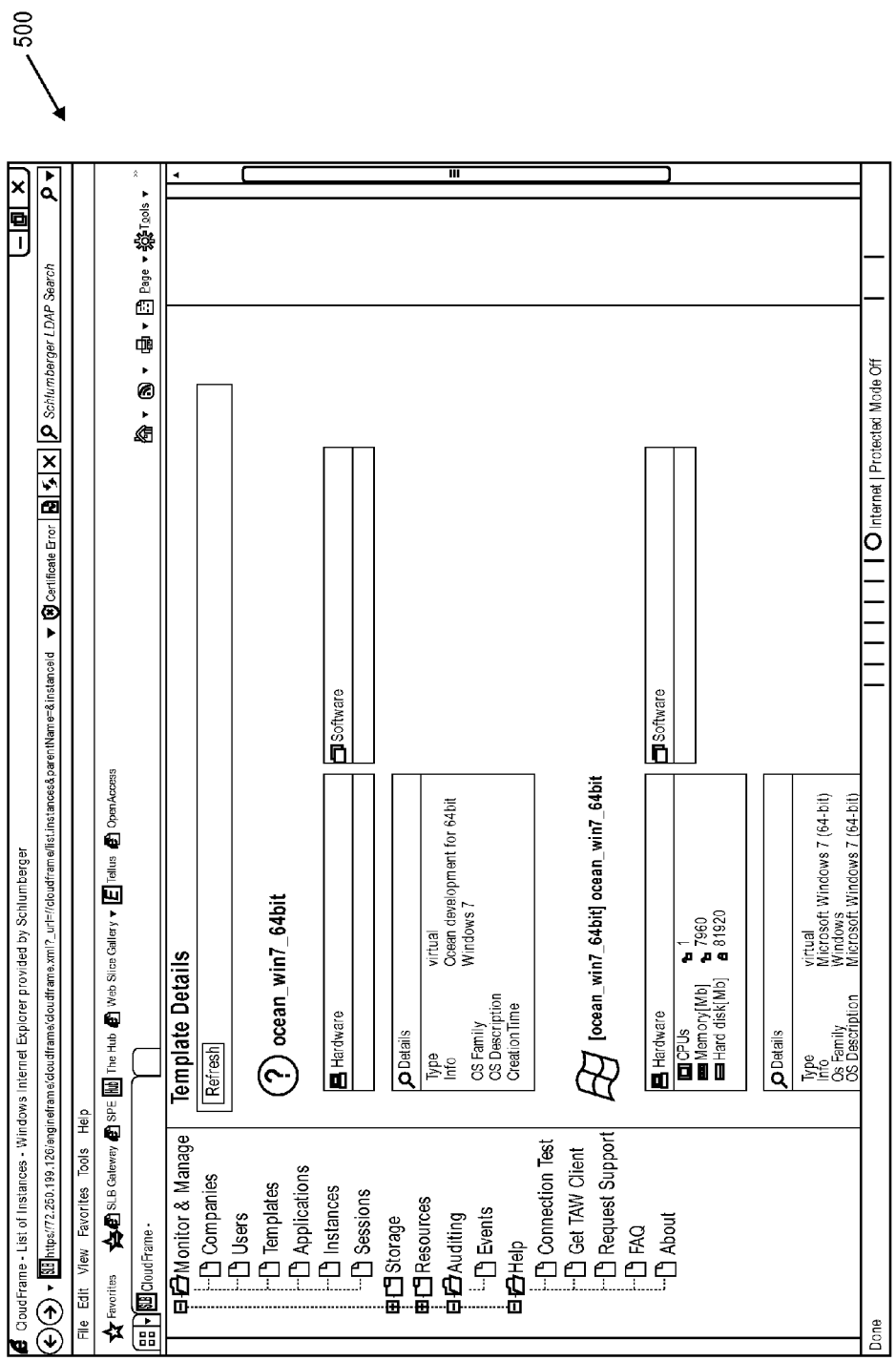
FIG. 5 is a schematic illustration of a user interface according to an embodiment of the present disclosure.

Referring briefly to FIG. 5, a schematic illustration of a user interface 500 is shown. The user interface 500 may provide information regarding one or more "templates." In an embodiment, multiple "linked" templates may be provided to control the requirements of one or more workflows or applications.

If an applicable template does not exist, then a company administrator may define a new template that is appropriate for a workflow. The foregoing templates are merely exemplary, and other templates that define various other hardware requirements are possible. In another exemplary embodiment, a CCE may be adapted to automatically suggest or select a template based upon one or more requirements related to a workflow.

Figure 6:
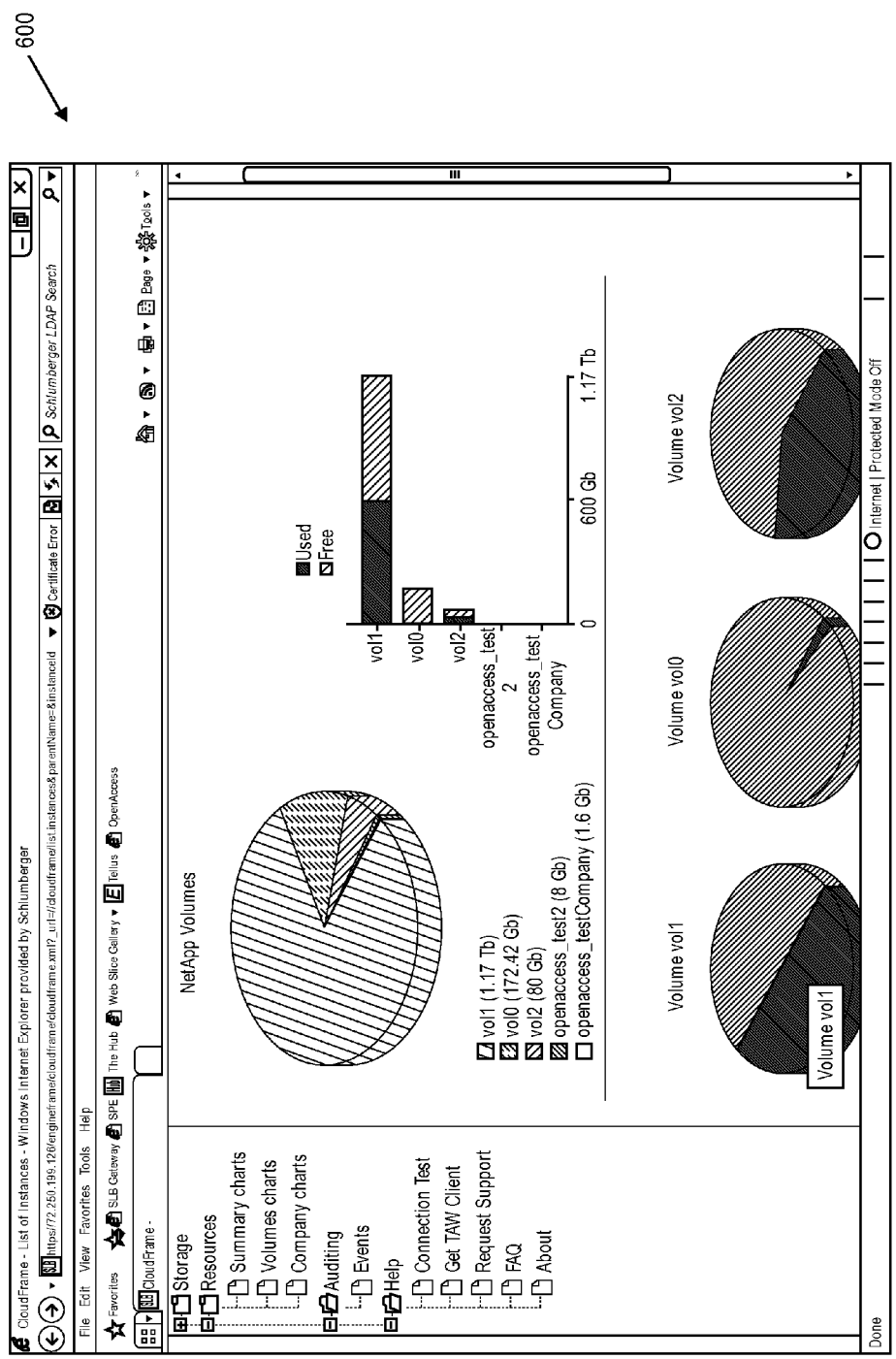
FIG. 6 is a schematic illustration of a user interface according to an embodiment of the present disclosure.

Referring now to FIG. 6, a schematic illustration of a user interface 600 is shown. The user interface 600 may include information regarding resource provisioning. The user interface 600 may provide a tool that allows for "thin provisioning" of storage.

In an embodiment, resource provisioning may include a "reserved resource" provisioning scheme. With reserved resource provisioning, a computing resource may be made available to a user regardless of whether the user is executing an application that requires the resource. In an embodiment, a reserved resource provisioning scheme may make a resource exclusive to a user (i.e., no other user may access this resource).

In another embodiment, resources may be provisioned according to a "dedicated resource" scheme. In a dedicated resource scheme, a resource may be made exclusively available for a user when running an application, provided that the user may have to wait until the resource becomes available. That is, other users may also be able to provision this resource, and when the resource has been provisioned by other users, a subsequent requesting user may have to wait until the current user releases its allocation of the resource. This behavior may be controlled via a queuing system.

In yet another embodiment, resources may be provisioned according to a "shared resource" scheme. In a shared resource scheme, a computer executing one or more virtual or physical machines may be shared amongst one or more users.

In an embodiment, a predetermined limit may be set as to how many concurrent users can allocate resources related to a particular computer. The predetermined limit may depend on one or more factors, including, without limitation, the type of work, type of user, type of hardware, and a company's priorities. Furthermore, one or more security policies may be defined to dictate whether users from different companies may access resources of a particular computer, or whether only users that are from the same company may access the resources of a particular computer.

Another resource provisioning scheme may include virtualization. For example, virtualization may be used with respect to applications that are limited to 2D graphics, and that are not resource intensive (e.g., light-weight applications). However, virtualization technology may not be able to offer the computing resources necessary for use with some 3D graphics and HPC applications.

The foregoing resource provisioning schemes are merely exemplary, and it should be understood that other resource provisioning schemes may be also used.

A business model may be tied to a resource provisioning scheme. For example, when using a shared resource provisioning scheme, a reserved instance may be the most expensive, and a shared resource may be the least expensive. Furthermore, in an embodiment, one or more instances may be assigned to different types of users.

Figure 7:
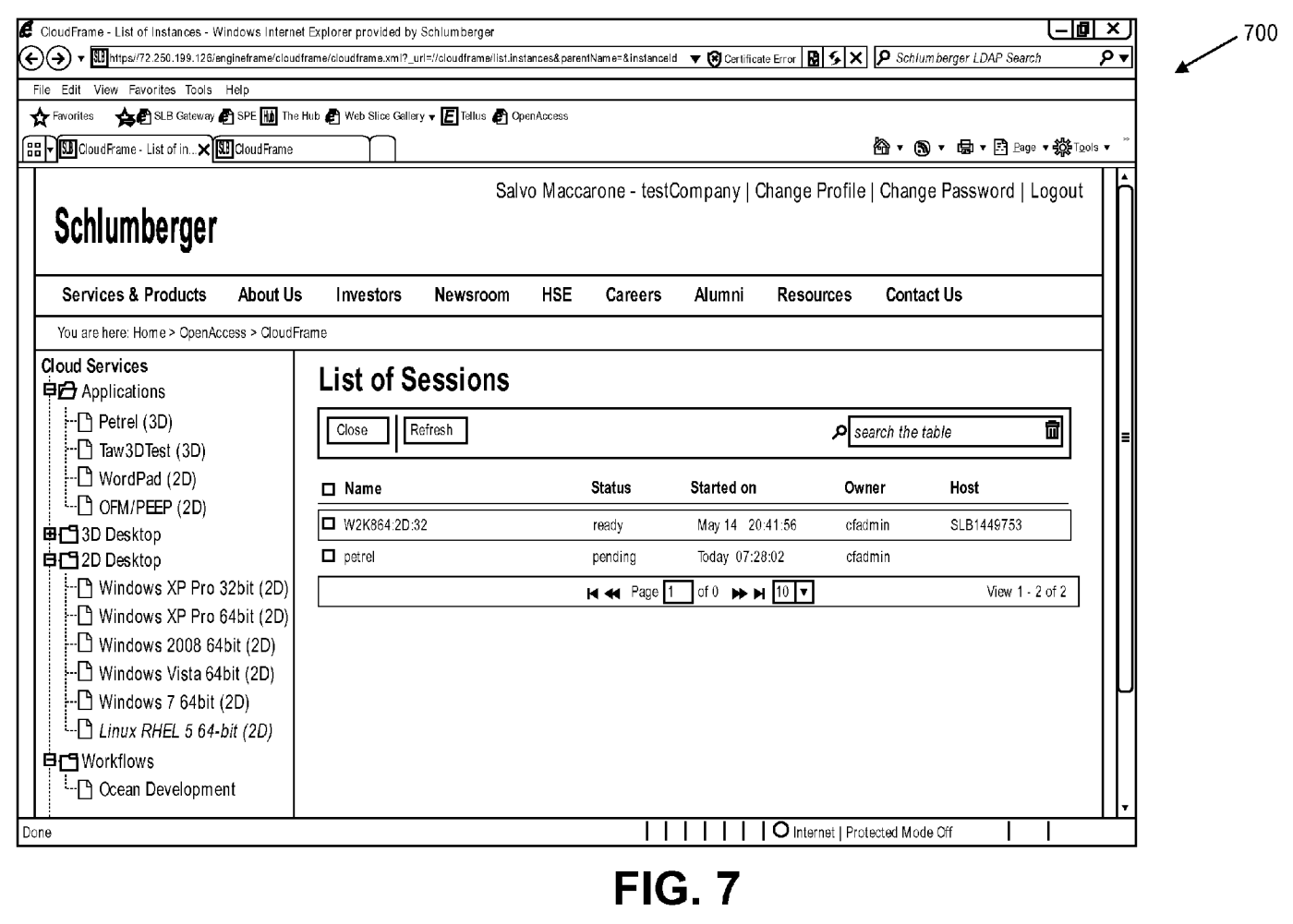

Upon allocating CCE resources, a company administrator may provision a session, as shown by block 320 of FIG. 3. Referring briefly to FIG. 7, a schematic illustration of a user interface 700 is shown. User interface 700 provides information regarding a "session." A session, according to an exemplary embodiment of the present disclosure, may include an application or workflow that has been provisioned with respect to suitable computing resources, and may be utilized by a user.

Referring back to FIG. 3, block 330 shows that upon initiation of a session, a CCE may submit a request to certain Infrastructure Provisioning Software (IPS). The IPS may include middleware that is responsible for managing physical and virtual resources.

Block 340 shows that upon receiving a request, the IPS may provision a PMI. In an embodiment, the IPS may submit a command to a queuing system which manages PMIs. The queuing system may determine the resource availability of one or more machines in a pool of machines that match the hardware requirements set forth in a template. For example, the queuing system may determine whether a particular machine is idle or busy with other sessions.

Once an available physical machine is identified, the PMI may be booted into an appropriate operating system, as shown by block 350. For example, if a user wants to use SCHLUMBERGER's PETREL software to perform the well spacing optimization workflow, a MICROSOFT WINDOWS VISTA 64-bit operating system may be initiated. The foregoing are merely exemplary, and it should be understood that other software and operating systems are also possible.

In an embodiment, productivity tools may be linked to a PMI from a separate cloud via technologies such as MICROSOFT SHAREPOINT. Alternatively, productivity tools may be hosted by a CCE.

A session may also be added to a PMI with other users on it as long as a PMI is running the correct operating system and a maximum number of allowed users for a machine is not exceeded. If no machines in a resource pool are available, a resource request may be placed in a waiting queue and a notification may be sent to a company administrator.

Block 360 shows that upon booting an operating system, a PMI may be connected to one of more the following: a domain, a license server, and/or a storage volume. In an embodiment, one or more of the foregoing may be reserved for a company. An allocated. PMI may also be connected to a remote 3D graphics server via remote desktop sessions.

IPS may determine whether a graphics server is overloaded, and may offload loads to other machines. In an embodiment IPS may coordinate the offloading based on whether a predetermined number of users are using such resources. The allocated PMI may also link to a queue on a computing cluster, and storage may be set up to improve performance by sharing the storage between a computing cluster and a physical machine adapted to execute petrotechnical software.

Upon initiation, a session may be readied for use. In an embodiment, a user may log on to the user's account, and find a "well spacing optimization" session ready for use. The user may connect to the session and launch an instance of this session, as shown at block 370.

Figure 8:
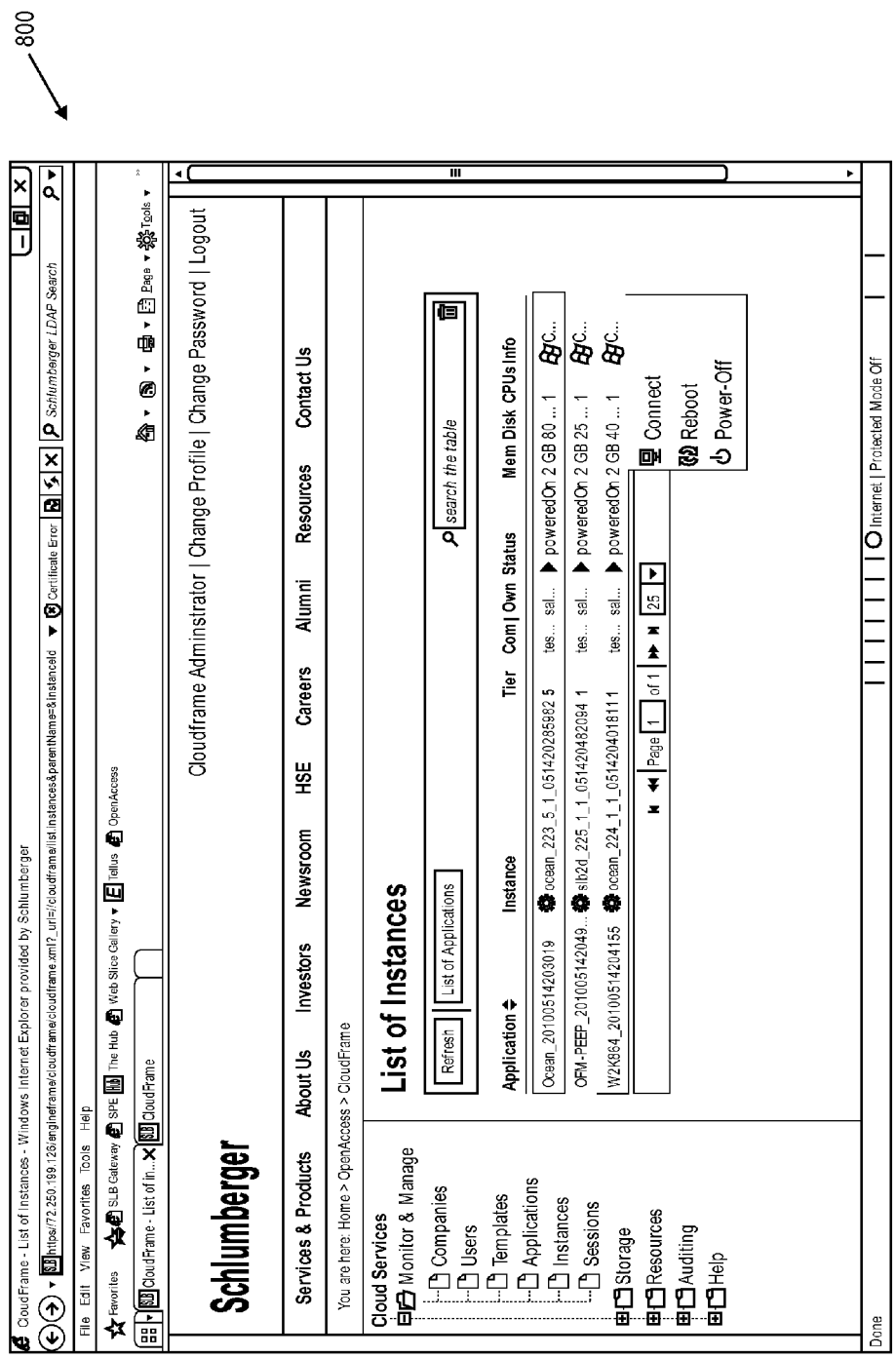
FIG. 8 is a schematic illustration of a user interface according to an embodiment of the present disclosure.

Referring briefly to FIG. 8, a schematic illustration is shown of a user interface 800. The user interface 800 may provide information regarding a plurality of "instances." An "instance" of a session may include a combination of hardware and software resources that is executing an application or a workflow.

Figure 9A:
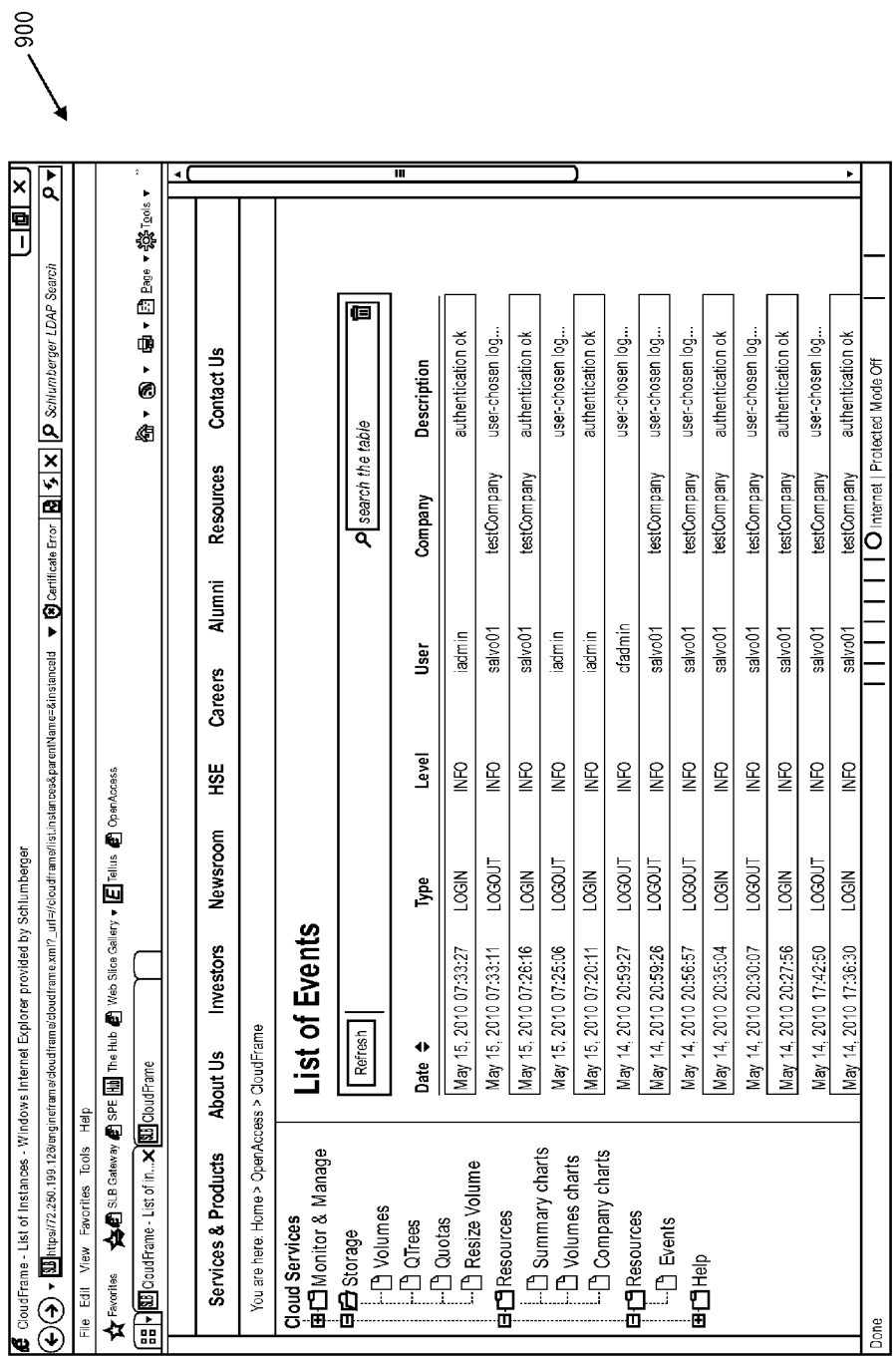
FIG. 9a is a schematic illustration of a user interface according to an embodiment of the present disclosure.

Activities of a user and/or a company administrator may be recorded and an audit trail. FIG. 9a is a schematic illustration of a user interface 900. The user interface 900 may include auditing information. In an embodiment, a CCE may log all CCE activities. Real-time resource monitoring may be implemented to monitor and record usage of hardware and software resources by a user and/or a company.

In an embodiment, when a software license is checked out (i.e., reserved for use), a time stamp may be written to a log. Likewise, when a software license is checked back in, a second timestamp may be written to the log. In an embodiment, a time stamp may be written to a log whenever a user checks out a feature of licensed software.

Hardware usage may be monitored. In an embodiment, network transactions and hardware resource usage may be tracked. For example, usage of CPUs, graphics cards, and storage may be monitored and logged. In an embodiment, a minimum use time interval may be defined to equal one minute.

The foregoing software and hardware metrics may be recorded in one or more logs. A log may be stored in an encrypted binary file, or as an unencrypted text file. Any other file format known in the art may also be used to create a log.

Referring back to FIG. 3, as shown at block 375, a CCE may read and process logs. In an embodiment, at various intervals, cloud orchestration software may read and process data saved in one or more logs. This may be done to determine incurred costs. For example, hardware and software resource usage hours may be multiplied by hourly costs associated with such resources. Other methods of determining incurred costs may also be used.

In an exemplary business model, software usage may be rounded up to a full hour. In another exemplary business model, minimum usage may be set to one hour if a user desires to allocate a license for a full hour. Alternatively, according to another exemplary business model, multiple instances of license usage for a single user that do not exceed one hour may be rounded up and invoiced as one hour.

With respect to hardware costs, a workstation running petrotechnical software may be shared by a plurality of users within a company. In an embodiment, when multiple users of a company are sharing resources, the company may be invoiced multiple times (e.g., one invoice per user).

When multithreading is disabled, incurred costs may be computed by tracking CPU usage on the machine for each user. The same may be true for the usage of CPUs on a cluster. Storage may be reserved, and may cost a fixed amount per unit of memory (e.g., megabyte, gigabyte, terabyte, etc.).

Usage of a network, 3D graphics server, and other infrastructure can be assessed as a flat fee or metered. Furthermore, priority access may be associated with certain resources. In an embodiment, priority access may require incurring a premium charge.

The foregoing are exemplary business models and exemplary costs, and it should be understood that other business models and costs are also within the scope of the present disclosure.

While a user is executing an instance, costs related to usage of hardware and/or software resources may be dynamically calculated, as shown in block 380. In an embodiment, an incurred cost may be compared to an assigned budget, and the remaining budget may be displayed to a user. A warning may be issued if a user has used up a predetermined percentage of a budget. In an embodiment, a company administrator may increase and/or decrease a budget depending on usage.

One or more budget tools may be provided to a user via a user interface. According to an embodiment, a cost estimator may be provided to allow a user to estimate a total cost of using hardware and software resources before actually using them. In another embodiment, resource usage may be processed at user-defined intervals and displayed in a user interface component. For example, actual usage may be compared to user and/or company-defined budgets.

Figure 9B:
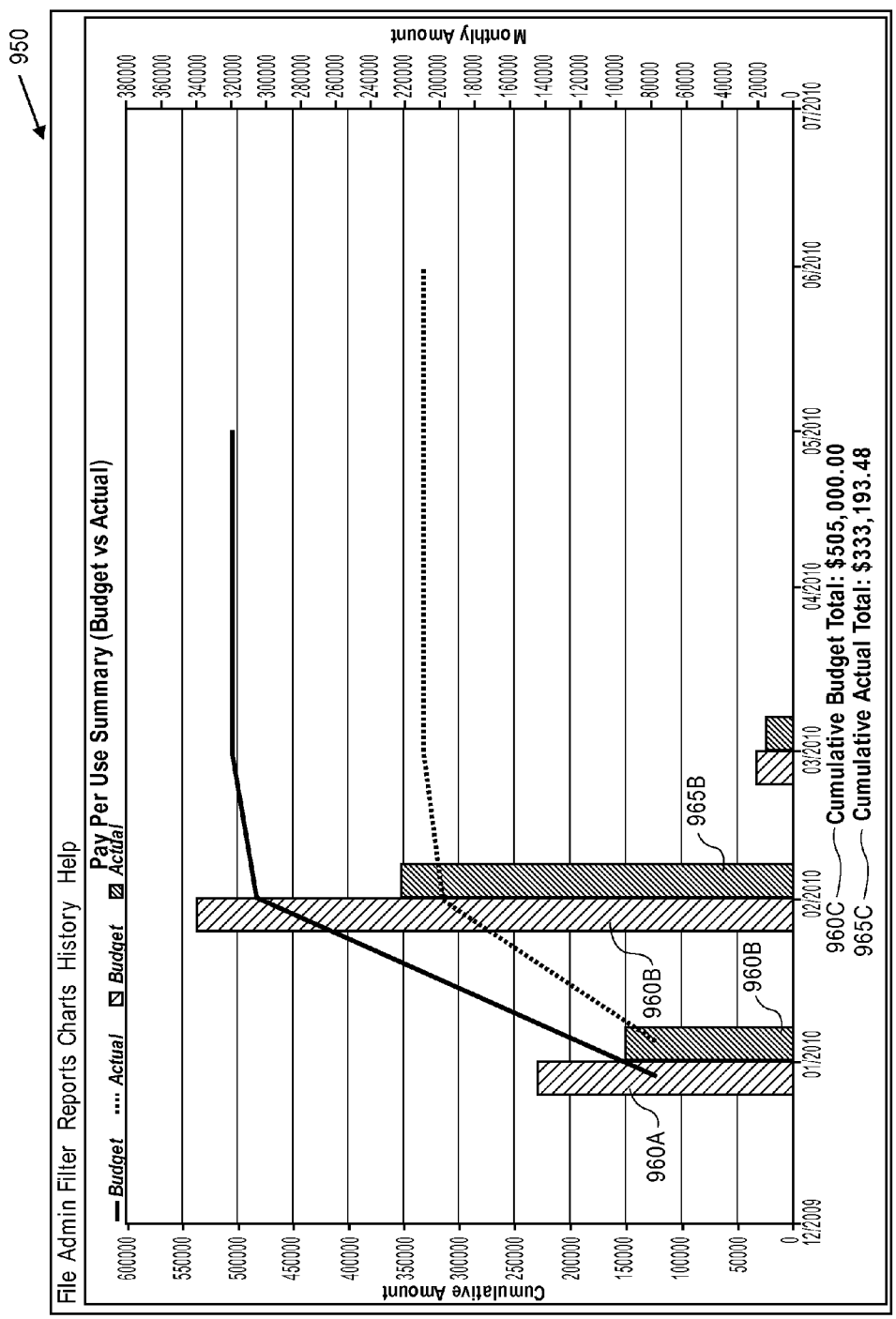
FIG. 9b is a schematic illustration of a user interface according to an embodiment of the present disclosure.

FIG. 9b is a schematic illustration of a user interface 950. The user interface 950 may include budget information 960*a-c* and information related to charges that a user has actually incurred 965*a-c*. Using user interface 950, a user may be able to track CCE usage and costs. In an embodiment, the user interface 950 may be updated in real-time, and in other embodiments, the user interface 950 may be updated from time to time in response to user actions (e.g., a mouse-click), or at pre-determined intervals. The exemplary user interface 950 shows monthly information. However, in other embodiments, the budget and actual information provided by user interface 950 may be represented over time using daily units, weekly units, quarterly units, yearly units, or any other periodic unit of time.

A representation of a defined budget may be displayed in a user interface, and modified in real-time to reflect actual resource usage. For example, a pie-chart, or some other graphical representation may be used to achieve the foregoing. In an embodiment, a warning may be displayed via a user interface if a remaining budget is less than a predetermined threshold of a budget. Users and/or companies may then increase the budget. A method of increasing the budget may involve executing a new agreement between the parties (e.g., using various online or offline methods).

Graphical output related to a session may be displayed remotely on a thin client device accessed by a user. As shown at block 382, a CCE may provide remote 3D visualization output related to an application that is being executed. For example, certain petrotechnical applications may rely on 3D graphics for model building and data visualization.

In certain embodiments, hosting such applications in a cloud environment may pose certain difficulties. These difficulties may be related to the fact that complex 3D graphics may need to be transferred to a remote location while still providing a fast interactive user experience. For example, remote visualization issues may arise because of co-location of 3D model building applications and computing infrastructure in a remote hosting facility. Furthermore, certain applications may be tightly linked to backend computing infrastructure for model processing, and the data transferred between frontend graphics computers and backend processing clusters may be very large (i.e., data related to seismic volumes may be stored in large files). With respect to the foregoing issues, high-speed interconnects and shared storage may improve performance of various aspects of a CCE.

3D graphical output may be transferred to a remotely located user using various image compression technologies, optimized transport protocols, and/or encryption. For example, certain optimizations may be implemented for low-bandwidth and high-latency links. Furthermore, network accelerators may be used to boost network performance. On multi-user systems with multiple 3D graphics cards, load balancing may be used to manage loads and run operations in a cost-effective manner.

In an embodiment, uploading and downloading of large data sets (e.g. seismic data) may be accomplished using data compression technologies and/or speed-optimized secure file transfer protocols. Data compression at a CCE hosting facility may be accelerated using hardware or software. For example, compression algorithms may be specifically optimized for data formats used in the oil and gas industry. Furthermore, file transfer protocols may use various TCP/IP optimization technologies, and may be adapted to work with multiple parallel streams.

Collaboration is another aspect of executing petrotechnical workflows that may be provided by a CCE. A CCE may be adapted to provision complex technical applications, cross-domain workflows, and real-time data streams from well sites, rigs, or other operational sites. For example, a team of engineers may need to work together as a virtual team. Two-way or multi-way collaboration tools may be used to facilitate communication amongst a team.

In an embodiment, collaboration technology may be linked to various petrotechnical hardware and software resources, and may be made into an integral part of an overall workflow solution. As shown at block 384, a CCE may provide users with access to resources that enable one or more collaboration technologies, including one or more of the following:

Sharing remote 3D graphics with one or more users (e.g., this may include handing over mouse control to others);
Videoconferencing;
Chat and instant messaging;
Email, SMS, and other notification technologies; and
Well site cameras and video streams.

The foregoing collaboration technologies are merely exemplary, and it should be understood that other collaboration technologies are also within the scope of the present disclosure.

In an embodiment, productivity tools, such as MICROSOFT OFFICE, may be hosted on a separate cloud and may be linked to petrotechnical sessions on demand. Alternatively, productivity tools may be hosted by a CCE. Usage may be tracked separately for external and internal users (e.g., in order to comply with licensing agreements).

As shown at block 388, when one or more tasks have been completed, a user may log off with respect to an instance. Logging off an instance may include, among other possibilities, either (a) logging off and keeping the instance running (e.g. so the processing of large workloads can continue), or (b) canceling an instance (i.e. the instance will be terminated).

Embodiments of a CCE may be able to automatically deploy petrotechnical software on suitable IT infrastructure in one or more places around the world. An oilfield services company may have one or more segments that may use a CCE. For example, one or more of the following segments of an oilfield services company may have a need to use a petrotechnical computing infrastructure: an information solutions segment, a consulting services segment, a data consulting services segment, a carbon services segment, an oilfield field services segment, and an integrated project management segment. The foregoing are merely exemplary, and it should be understood that other segments may also benefit from a CCE.

Various segments of an oilfield services company may wish to implement initiatives related to fixing problems associated with a petrotechnical IT environment. However, challenges may arise with respect to such initiatives due to the complexity of petrotechnical IT environments and the scarcity of petrotechnical know-how within such departments.

Example scenarios of how one or more segments of an oilfield services company can use embodiments of a CCE are set forth below. For each scenario, CCE resources may be allocated automatically for an a priori unknown number of users, and may be adapted to respond to constantly changing needs.

In a data consulting services (DCS) segment, engineers may be tasked to work on a field development project. One or more data and computing infrastructure services may be provided by a CCE located anywhere in the world. For example, SCHLUMBERGER's PETREL SOFTWARE and ECLIPSE SOFTWARE, and other engineering software tools may be run remotely via a CCE. This may provide multi-site collaboration by enabling real-time data streaming from a field located remotely with respect to the CCE (e.g., for drilling and microseismic monitoring).

As another example, a CCE may be used by a carbon services (CS) segment that is operating a carbon sequestration project. Data acquired during a sequestration process (e.g. pressures, temperatures, continuous microseismic, DTS, etc.) may be sent to an SCC. Remote control of an acquisition system may be possible from within an internal network from the SCC and a company's network. Secure access to a real-time monitoring portal may be provided for one or more entities, including, without limitation, engineers, customers, universities, and governmental agencies (e.g., the Department of Energy).

At various times, engineering calculations (e.g. geomechanical evaluations of a formation) may need to be performed using petrotechnical software, such as SCHLUMBERGER PETREL software, SCHLUMBERGER ECLIPSE software, or SCHLUMBERGER VISAGE software. However, execution of such petrotechnical software may require complex computing requirements that may only be provided by a complex IT infrastructure. In such cases, it may not be financially viable to build and maintain such complex IT infrastructure for only sporadic usage. Accordingly, it may be advantageous for a CS segment to take advantage of a CCE which can provide access to hardware and software resources in a cost-effective on-demand manner.

An oilfield field services (OFS) segment may also use a CCE. Segments that perform work in the field may use advanced collaboration and communication tools to enable communication with a back office. OFS segments may rely on petrotechnical software, such as SCHLUMBERGER PETREL software, as an integration platform for certain engineering workflows and decision-making processes. However, availability of computing power for executing complex engineering software in the field may be limited. For example, a field laptop configuration might not be able to provide adequate computing resources for such purposes.

A CCE may provide access to a centrally-located high-performance IT infrastructure accessible via a public network, such as the Internet. In an embodiment, a CCE may be adapted to provide on-demand access to certain commercial and/or in-house software via a laptop, or other mobile computing device, that has limited computing and visualization resources. Another advantage of some embodiments of a CCE is that petrotechnical software may be updated at a centralized location (i.e., the CCE host location), thereby reducing maintenance related to keeping software up-to-date on mobile computing devices.

Substantially instant assignment of hardware and software resources is yet another advantage of some embodiments of a CCE. As discussed above, a CCE may provide a web-based interface that may be adapted to allow a user to provision CCE resources with substantially minimal IT knowledge, and with substantially minimal IT support. This may make a CCE a fast and cost-effective method for delivering technology to a field location.

An artificial lift and/or sand management segment may also benefit from centralized provisioning of hardware and software resources. For example, an artificial lift and/or sand management segment may, from time to time, use nodal analysis and pipeline simulation software (e.g. SCHLUMBERGER PIPESIM software, and internal and external versions of SCHLUMBERGER AVOCET WSM software). However, it may be costly and cumbersome to install and configure such software on a user's laptop just for sporadic use. Instead, such petrotechnical software may be provided by a CCE via a web-based interface, thereby making such software securely accessible from any location and by any computer.

As another example of a segment that may benefit from centralized provisioning of hardware and software resources, a hydraulic fracture monitoring (HFM) segment may monitor microseismic events during hydraulic fracturing (e.g. in shale gas) using SCHLUMBERGER PETREL software. In an embodiment, a CCE may provide HFM users with access to fracture spacing optimization functionality via computers that are adapted to provide HPC-specific integrated workflows.

A drilling and measurement (D&M) segment may conduct meetings during drilling operations. SCHLUMBERGER PETREL software may provide multi-point voice and video-conferencing together with remote use of drilling applications. However, such functionality may not run well on a particular laptop. Accordingly, a CCE may be optimized to provide such collaborative functionality to one or more remote users.

Furthermore, a quality, health, safety and environment (QHSE) segment may also benefit from a CCE. For example, video streaming servers may be installed at a CCE hosting location in order to manage image and video data that is provided by one or more still cameras and/or video cameras installed at various well sites or OFS bases. This may enable the monitoring of remote operations and provide quality control and guidance from remote experts located at a back-office. A CCE may provide remote control of the well site cameras, and may also enable a user to grant one or more customers with access to the remotely-installed cameras.

An information solution segment (IS) may benefit from the ability to execute one or more uncertainty and optimization workflows on an HPC infrastructure provided by a CCE. Such HPC infrastructure may not be available in certain locations in the world, and furthermore, the know-how required to properly execute certain workflows may also only exist in certain other locations in the world. Accordingly, a CCE may enable groups located at various locations around the world to collaborate, and thereby take advantage of expertise located at a centralized remote location in a cost-effective manner.

Figure 10:
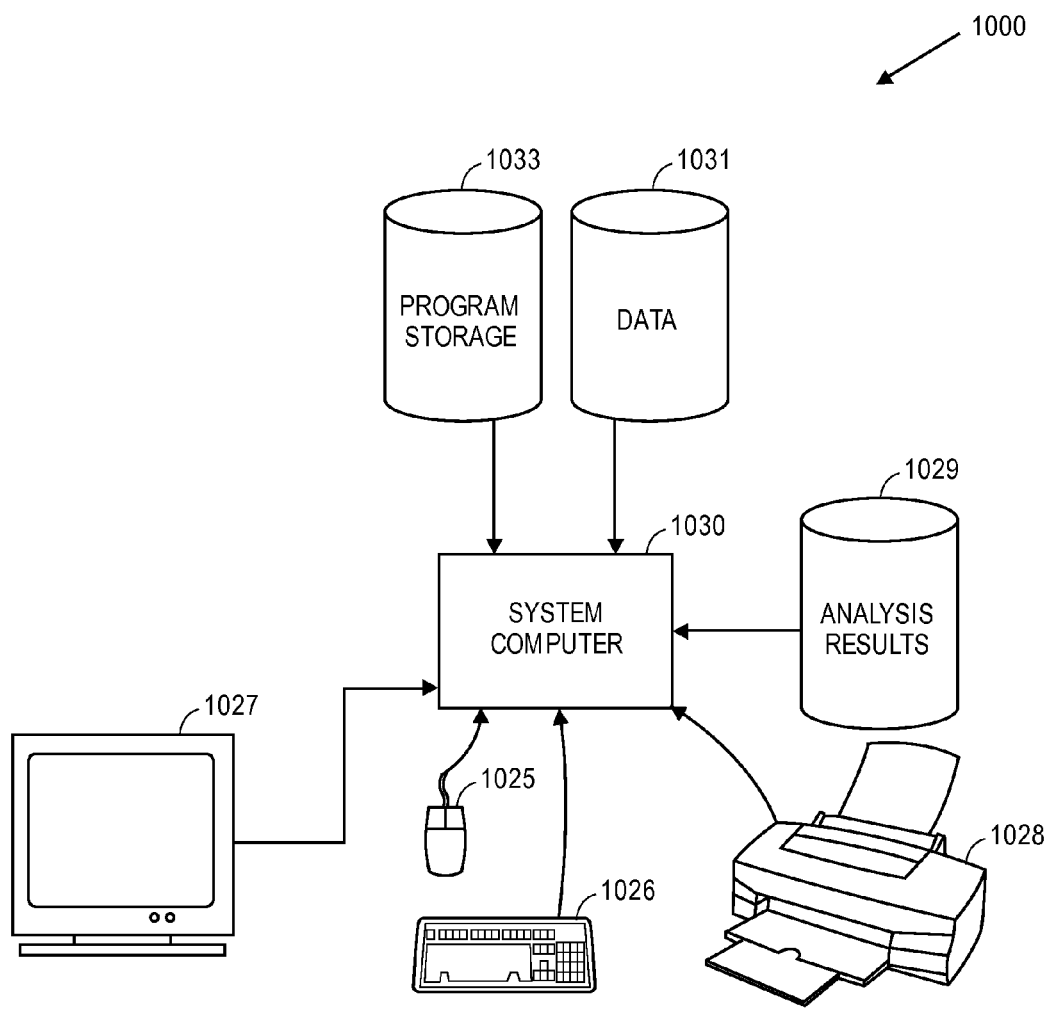
FIG. 10 is a schematic illustration of a computing system according to an embodiment of the present disclosure.

FIG. 10 illustrates a computer system 1000 into which implementations of various technologies described herein may be implemented. In an exemplary embodiment of the present disclosure, the computing device 400 may include one or more aspects of the computer system 1000.

The computing system 1000 (system computer) may include one or more system computers 1030, which may be implemented as any conventional personal computer or server. However, those skilled in the art will appreciate that implementations of various techniques described herein may be practiced in other computer system configurations, including hypertext transfer protocol (HTTP) servers, hand-held devices, multiprocessor systems, microprocessor-based or programmable consumer electronics, network PCs, minicomputers, mainframe computers, and the like.

The computing system 1030 may be in communication with disk storage devices 1029, 1031, and 1033, which may be external hard disk storage devices. It is contemplated that disk storage devices 1029, 1031, and 1033 are conventional hard disk drives, and as such, will be implemented by way of a local area network or by remote access. Of course, while disk storage devices 1029, 1031, and 1033 are illustrated as separate devices, a single disk storage device may be used to store any and all of the program instructions, measurement data, and results as desired.

In one implementation, exploration and production data may be stored in disk storage device 1031. The system computer 1030 may retrieve the appropriate data from the disk storage device 1031 according to program instructions that correspond to implementations of various techniques described herein. The program instructions may be written in a computer programming language, such as C++, Java and the like. The program instructions may be stored in a computer-readable medium, such as program disk storage device 1033. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 1030. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

In one implementation, the system computer 1030 may present output primarily onto graphics display 1027, or alternatively via printer 1028. The system computer 1030 may store the results of the methods described above on disk storage, for later use and further analysis. The keyboard 1026 and the pointing device (e.g., a mouse, trackball, or the like) 1025 may be provided with the system computer 1030 to enable interactive operation. In an embodiment, printing may be initiated at a CCE, and print data may be sent from a CCE to a printer that is local to a remote user.

The system computer 1030 may be located at a data center remote from where data may be stored. The system computer 1030 may be in communication with various databases having different types of data. These types of data, after conventional formatting and other initial processing, may be stored by the system computer 1030 as digital data in the disk storage 1031 for subsequent retrieval and processing in the manner described above. In one implementation, these data may be sent to the system computer 1030 directly from the databases. In another implementation, the system computer 1030 may process data already stored in the disk storage 1031. When processing data stored in the disk storage 1031, the system computer 1030 may be described as part of a remote data processing center. The system computer 1030 may be configured to process data as part of the in-field data processing system, the remote data processing system or a combination thereof. While FIG. 10 illustrates the disk storage 1031 as directly connected to the system computer 1030, it is also contemplated that the disk storage device 1031 may be accessible through a local area network or by remote access. Furthermore, while disk storage devices 1029, 1031 are illustrated as separate devices for storing input data and analysis results, the disk storage devices 1029, 1031 may be implemented within a single disk drive (either together with or separately from program disk storage device 1033), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
providing a cloud computing environment (CCE) comprising a plurality of processing resources, wherein the processing resources comprise at least one virtual machine and at least one physical machine;
receiving, at the CCE, a request from a user for performing a petrotechnical workflow, wherein the user is remotely located with respect to the CCE and the petrotechnical workflow uses a three-dimensional visualization;
provisioning, using a processor system, by allocating, over a network, usage of one or more provisioned processing resources from the plurality of processing resources, for performing the petrotechnical workflow, wherein provisioning comprises:

determining a type of provisioning scheme with which the user, the request, or both are associated;

determining that the petrotechnical workflow is associated with a physical machine instance based on the petrotechnical workflow using the three-dimensional visualization;

determining to provision at least one of the processing resources for executing the petrotechnical workflow, wherein the at least one of the processing resources comprises one or more physical machines of the at least one physical machine;

automatically determining a load status of the at least one physical machine and assigning the one or more physical machines to the user based on an amount of usage of the one or more physical machines, wherein the one or more physical machines boot into a particular operating system; and provisioning each of the one or more physical machines of the processing resources, wherein the one or more physical machines are provisioned based on hardware requirements indicated by the physical machine instance and based on the petrotechnical workflow using the three-dimensional visualization;

performing the petrotechnical workflow using the at least one of the processing resources, whereby the three-dimensional visualization is generated using the one or more physical machines;

providing the generated three-dimensional visualization to a remote client device of the user; and associating a cost with usage of the at least one of the processing resources for performing the petrotechnical workflow.

2. The method of claim 1, wherein the at least one of the processing resources is automatically provisioned based upon one or more requirements of the petrotechnical workflow.

3. The method of claim 1, further comprising:
defining a template for selecting one or more of the plurality of processing resources,
wherein the template specifies at least whether the physical machine instance is associated with the petrotechnical workflow, and
wherein provisioning one or more of the plurality of processing resources comprises selecting the template.

4. The method of claim 1, further comprising:
determining, in real-time, the cost associated with usage of the at least one of the processing resources; and
displaying to the user a comparison of the cost and a predetermined budget.

5. The method of claim 1, further comprising transferring data related to seismic volumes between the CCE and the user.

6. The method of claim 1, further comprising:
providing a collaboration tool to the user, wherein the collaboration tool enables the user to collaborate with a second user in connection with performing the petrotechnical workflow.

7. A system, comprising:
a memory; and
a processor operatively connected to the memory and having functionality to execute instructions for:
providing a cloud computing environment (CCE) comprising a plurality of processing resources, wherein the processing resources comprise at least one virtual machine and at least one physical machine;
receiving, at the CCE, a request from a user for performing a petrotechnical workflow, wherein the user is remotely located with respect to the CCE and the petrotechnical workflow uses a three-dimensional visualization;

provisioning one or more provisioned processing resources from the plurality of processing resources, for performing the petrotechnical workflow, wherein provisioning comprises:
determining that the petrotechnical workflow is associated with a physical machine instance based on the petrotechnical workflow using the three-dimensional visualization;

determining to provision at least one of the processing resources for executing the petrotechnical workflow, wherein the at least one of the processing resources comprises one or more physical machines of the at least one physical machine;

determining a type of provisioning scheme with which the user, the request, or both are associated;

automatically determining a load status of the at least one physical machine and assigning the one or more physical machines to the user based on an amount of usage of the one or more physical machines, wherein the one or more physical machines boot into a particular operating system; and provisioning each of the one or more physical machines of the processing resources, wherein the one or more physical machines are provisioned based on hardware requirements indicated by the physical machine instance and based on the petrotechnical workflow using the three-dimensional visualization;

performing the petrotechnical workflow using the at least one of the processing resources, whereby the three-dimensional visualization is generated using the one or more physical machines;

providing the generated three-dimensional visualization to a remote client device of the user; and associating a cost with usage of the at least one of the processing resources for performing the petrotechnical workflow.

8. The system of claim 7, wherein the at least one of the processing resources is automatically provisioned based upon one or more requirements of the petrotechnical workflow.

9. The system of claim 7, the processor further having functionality to execute instructions for:
defining a template for selecting one or more of the plurality of processing resources, and wherein provisioning one or more of the plurality of processing resources comprises selecting the template.

10. The system of claim 7, the processor further having functionality to execute instructions for:
determining, in real-time, the cost associated with usage of the at least one of the processing resources; and
displaying to the user a comparison of the cost and a predetermined budget.

11. The system of claim 7, the processor further having functionality to execute instructions for transferring data related to seismic volumes between the CCE and the user.

12. The system of claim 7, the processor further having functionality to execute instructions for:
providing a collaboration tool to the user, wherein the collaboration tool enables the user to collaborate with a second user in connection with performing the petrotechnical workflow.

13. A non-transitory computer-readable storage medium storing instructions, wherein the instructions, when executed, are configured to cause a processor to perform operations, the operations comprising:

provewriting a cloud computing environment (CCE) comprising a plurality of processing resources comprising at least one virtual machine and at least one physical machine;

receiving, at the CCE, a request from a user for performing a petrotechnical workflow, wherein the user is remotely located with respect to the CCE and the petrotechnical workflow uses a three-dimensional visualization;

determining a type of provisioning scheme with which the user, the request, or both are associated, wherein the type is one of a reserved resource scheme, a dedicated resource scheme, or a shared resource scheme;

provisioning one or more provisioned processing resources from the plurality of processing resources for performing the petrotechnical workflow, wherein provisioning comprises:

determining that the petrotechnical workflow is associated with a physical machine instance based on the petrotechnical workflow using the three-dimensional visualization;

determining to provision at least one of the processing resources for executing the petrotechnical workflow, wherein the at least one of the processing resources comprises one or more physical machine of the at least one physical machine;

automatically determining a load status of the at least one physical machine and assigning the one or more physical machines to the user based on an amount of usage of the one or more physical machines, wherein the one or more physical machines boot into a particular operating system; and provisioning each of the one or more physical machines of the processing resources, when the physical machine instance is associated with the petrotechnical workflow, wherein the one or more physical machines are provisioned based on hardware requirements indicated by the physical machine instance and based on the petrotechnical workflow using the three-dimensional visualization;

performing the petrotechnical workflow using the at least one of the processing resources, whereby the three-dimensional visualization is generated using the one or more physical machines;

providing the generated three-dimensional visualization to a remote client device of the user; and associating a cost with usage of the at least one of the processing resources for performing the petrotechnical workflow.

14. The computer-readable medium of claim 13, wherein the at least one of the processing resources is automatically provisioned based upon one or more requirements of the petrotechnical workflow.

15. The computer-readable medium of claim 13, wherein the operations further comprise:

defining a template for selecting one or more of the plurality of processing resources, and wherein provisioning one or more of the plurality of processing resources comprises selecting the template.

16. The computer-readable medium of claim 13, wherein the operations further comprise:

determining, in real-time, the cost associated with usage of the at least one of the processing resources; and displaying to the user a comparison of the cost and a predetermined budget.

17. The computer-readable medium of claim 13, wherein the operations further comprise transferring data related to seismic volumes between the CCE and the user.

18. The method of claim 1, wherein the provisioning further comprises:

determining that the petrotechnical workflow requires resources that exceed a capability of the at least one of the processing resources; and in response, provisioning one or more additional resources.

19. The method of claim 1, wherein the physical machine instance includes an indication of a level of hardware resource requirements.

20. The method of claim 1, wherein the one or more physical machines are optimized for executing a petrotechnical application associated with the petrotechnical workflow.

21. The method of claim 1, wherein the provisioning further comprises:

determining to provision a second processing resource of the processing resources for executing the petrotechnical workflow, wherein the second processing resource comprises one or more virtual machines of the at least one virtual machine; and provisioning the one or more virtual machines of the processing resources, wherein the one or more physical machines are provisioned based on virtual machine requirements indicated by a virtual machine instance.

22. The system of claim 7, wherein the provisioning further comprises:

determining to provision a second processing resource of the processing resources for executing the petrotechnical workflow, wherein the second processing resource comprises one or more virtual machines of the at least one virtual machine; and provisioning the one or more virtual machines of the processing resources, wherein the one or more physical machines are provisioned based on virtual machine requirements indicated by a virtual machine instance.

* * * * *